United States Patent [19]

Fogler et al.

[11] Patent Number: 4,916,095
[45] Date of Patent: Apr. 10, 1990

[54] MODIFIED CLAY SORBENTS

[75] Inventors: H. Scott Fogler, Ann Arbor; Keeran R. Srinivasan, Livonia, both of Mich.

[73] Assignee: The University of Michigan, Ann Arbor, Mich.

[21] Appl. No.: 219,091

[22] Filed: Jul. 14, 1988

[51] Int. Cl.$^4$ .............................................. B01J 21/16
[52] U.S. Cl. ........................................ 502/62; 502/84
[58] Field of Search ..................................... 502/62, 84

[56] References Cited

U.S. PATENT DOCUMENTS

| | | | |
|---|---|---|---|
| 3,657,151 | 4/1972 | Noble | 502/62 |
| 4,033,764 | 7/1977 | Colegate et al. | 502/62 |
| 4,549,966 | 10/1985 | Beall | 210/661 |
| 4,629,713 | 12/1986 | Suzuki et al. | 502/62 |
| 4,740,488 | 4/1988 | Fogler et al. | 502/84 |

Primary Examiner—Carl F. Dees
Attorney, Agent, or Firm—Rohm & Monsanto

[57] ABSTRACT

A novel modified clay sorbent and method of treating industrial effluents to remove trace pollutants, such as dioxins, biphenyls, and polyaromatics such as benzo(a)pyrene and pentachlorophenol. The novel clay sorbent has a composite structure in which the interlayer space of an expandable clay, such as smectite, is filled with polyvalent or multivalent inorganic cations which forces weaker surfactant cations to locate on the surface of the clay in such an orientation that the resulting composite is hydrophilic in nature. A specific example is cetylpyridinium-hydroxy aluminum-montmorillonite. In certain embodiments, a non-expanding clay, such as kaolinite, is used and surfactant cations are necessarily located on an external surface of the clay. A specific example is cetylpyridinium-kaolinite.

19 Claims, 5 Drawing Sheets

MODIFIED CLAY SORBENTS

This invention was made with government support under EPA Grant Number R812555-010 awarded by the Environmental Protection Agency and Grant Number DE-FG22-87PC79918 awarded by the Department of Energy, Pittsburgh Energy Technology Center. The government has certain rights in the invention.

BACKGROUND OF THE INVENTION

This invention relates generally to modified clay sorbents, and more particularly to modified clay sorbents useful for removing trace pollutants from industrial effluent streams.

There is a clear, generally known need to reduce the level of pollution in the aquatic environment. A significant first step in effecting reduction of the level of such pollution would be achieved by removing trace levels of organic contaminants, such as polychlorinated biphenyls (PCBs), polychlorinated dioxins (PCDDs), and polychlorinated dibenzofurans (PCDFs). Such trace organic contaminants are found in industrial effluent water as undesirable by-products of chemical manufacturing. For example, 2,3,7,8-Tetrachlorodioxin (2,3,7,8-TCDD) is formed during the production of 2,4,6-Trichlorophenol, which is an ingredient of many pesticides. Even at extremely low concentrations, 2,3,7,8-TCDD is the most toxic isomer of dioxin and is generally referred to as "Dioxin." Polychlorinated dioxins are commonly found in paper mill effluents and polyaromatic hydrocarbons contaminate coal conversion waste water streams.

A known, highly advantageous technique for removing trace amounts of organic pollutants in very large volumes of waste water, utilizes a sorbent to which the contaminant is adsorbed. The most commonly used adsorbent today is activated carbon, the production of which utilizes a wide variety of carbonaceous starting materials, such as anthracite and bituminous coal, carbonized shells, peat, etc. The various known methods of activating charcoal can be grouped into two categories. The first category includes chemical activation wherein the carbonaceous materials are impregnated with an activating agent and then pyrolyzed. The second category comprises heat treatment processes wherein chars are heated to temperatures between 350° and 1000° C. in the presence of $CO_2$, $N_2$, $O_2$, HCl, $Cl_2$, $H_2O$ and other gases. A portion of the char is burned as the surface area and "activity" of the carbon increases. Modern manufacturing techniques, which include careful monitoring of the activation parameters, yield activated products having high surface areas in a wide range of uniform particle sizes.

In addition to activated charcoal, natural soils and sediments containing various amounts of bound organic carbon or synthetic "zeolite-like" sorbents with specific affinity for rigid, planar aromatic molecules like dioxin have been considered. All of the known systems have significant problems, however, which render them substantially less than ideal for the purpose of removing trace organics from large quantities of water. Activated charcoal and synthetic sorbents are very expensive and therefore do not provide an economical solution to the problem. Natural soils and sediments are less expensive than the activated charcoal and synthetic sorbents, but are not uniform, and in fact exhibit too much variation in binding affinity to be used in large scale technology.

In addition to the systems discussed hereinabove for the disposal of organic pollutants, such as Dioxin, a variety of other methods are known. These include: photolytic dechlorination, microbial degradation, and thermal decomposition. It is a problem with all three of these processes that they are ineffective when the polluting compound is present in water at extremely low concentrations, illustratively on the order of pptr to ppq. To date, however, no microorganism has yet been developed which is capable of degrading Dioxin. The process of thermal decomposition requires operating temperatures in excess of 1000° C., and the technology required to implement this process is still in a developmental stage.

Swelling clays, generically designated as smectites, have been used widely in the prior art as catalysts, catalyst supports, molecular sieves, adsorbers, and absorbers. The utility of these clays for the stated purposes is derived from the physical properties of the clay itself. Smectites, such as montmorillonite, have a layered lattice structure in which two-dimensional oxyanions are separated by layers of hydrated cations. The layered structure enables intercalation of layers of a different character between the sheets of the clay structure.

"Pillared" clays have been developed wherein intercalated thermally stable cations act as props, or pillars, to support the silicate layers of the clay in the absence of a swelling solvent. In one particular example, the clay is treated with hydroxy aluminum polymers or oligomers in solution, and subsequently the clay is dried and calcined to produce supporting pillars between clay layers. Such pillars leave pores having a rectangular opening configuration, framed by the pillars and the clay layers. The pillar size, or spacing, and hence, the pore size of the clays can be adjusted so as to permit the making of suitable catalysts, catalyst supports, molecular sieves, etc., for various purposes, particularly in the petroleum processing field. The "pillared" clays, however, are not usable as a sorbent for industrial pollutants in an aqueous effluent stream. It is to be remembered that the term "adsorption" generally refers to a first step in catalysis and may not necessarily be applicable to the mechanism of a process for removing pollutants from industrial effluents. As is known, a catalyst will adsorb and release. Effluent treatment, however, requires that the composition adsorb the pollutant and retain same.

Organoclays have been used to remove organic contaminants from waste water. Several such examples are disclosed in U.S. Pat. No. 4,549,966 issued to Beall on October 29, 1985. Conventional organoclays have cationic surfactant ions localized in the interlayer space between clay lamellae. Organoclays are typically synthesized by cation-exchange of the cation of an ion exchange form of clay, such as $Na^+$-montmorillonite, with the organic surfactant cation.

Figure 1:
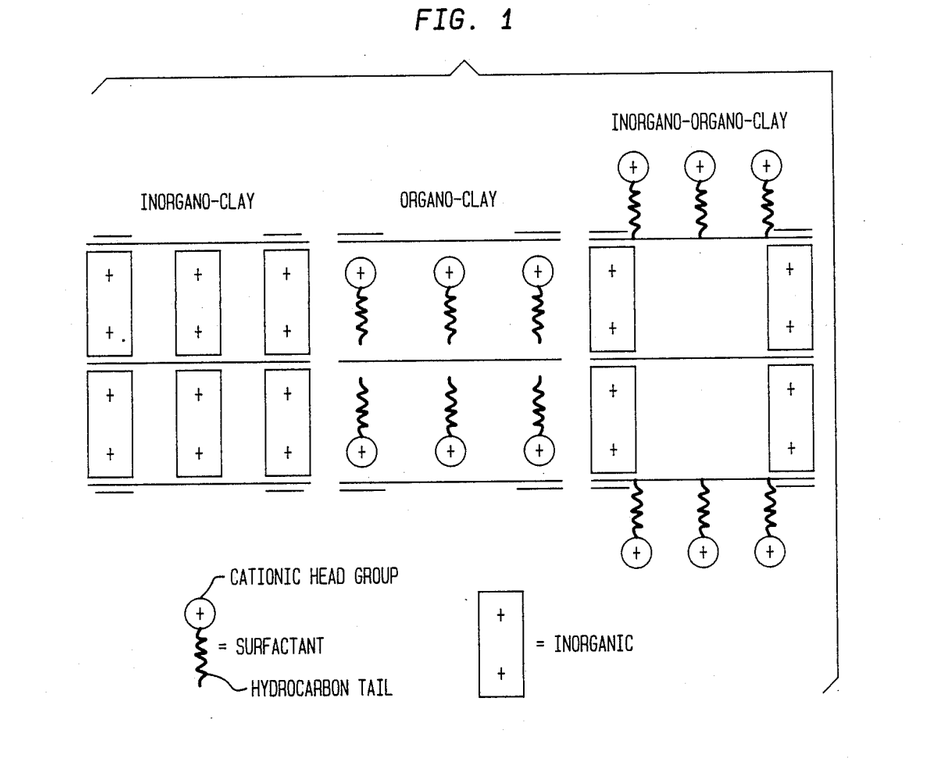
FIG. 1 is an idealized, schematic representation, for comparative purposes, of the structure of inorganoclay, organoclay, and the novel inorgano-organoclay composite of the instant invention.

A specific example of an organoclay is cetylpyridinium chloride-montmorillonite which is formed by ion-exchanging $Na^+$-montmorillonite with cetylpyridinium chloride, a monovalent surfactant. Since montmorillonite is an expandable clay, the cetylpyridinium ion (cationic surfactant) will be localized in the interlayer space between clay lamellae through strong and favorable electrostatic interaction between the negatively-charged clay surface and the cationic head group of the cetylpyridinium ion. The hydrocarbon tail of the surfactant ion will point away from the clay surface, thus providing an organic carbon surface layer for the sorption of toxic wastes. Reference to FIG. 1 shows an idealized schematic representation of a prior art organoclay.

Another type of modified clay sorbent which has been utilized to remove traces of organic contaminants from aqueous effluents is more completely described in U.S. Pat. No. 4,740,488 issued to Fogler, et al. on April 26, 1988. This clay is an example of a new class of two-dimensional "zeolite-like" clays which have an increased surface area and an extensive micropore structure. The term "inorganoclay" is used herein to designate this type of modified clay sorbent. Reference to FIG. 1 shows an idealized schematic representation of the structure of an inorganoclay. The microporosity of these sorbents in combination with the hydrophilic nature of its surface results in an extremely effective sorbent for the specific adsorption of highly hydrophobic, toxic organics. A specific example of such an inorganoclay is the hydroxy aluminum montmorillonite clay described in the aforementioned U.S. Pat. No. 4,740,488.

It is, therefore, an object of this invention to provide an inexpensive and effective system for removing organic contaminants from an aquatic environment.

It is another object of this invention to provide a system for removing organic contaminants present in an aqueous environment in trace concentrations on the order of between ppm and ppq.

It is also an object of this invention to provide a system for removing organic contaminants from an industrial waste water streams, the contaminants including, inter alia, dioxins, polyaromatics, PCBs, PCDFs, and PCDDs.

It is a further object of this invention to provide a sorbent material having high sorptive capacity and binding affinity for organic pollutants.

It is additionally an object of this invention to provide a sorbent material having a greater sorptive capacity for organic contaminants than activated carbon, the current industry standard, and which is more economical to produce than activated carbon.

It is still another object of this invention to provide a sorbent material which is inexpensive to use, due to, inter alia, low cost starting materials and high sorptive capacity so that smaller quantities of sorbent are required.

It is yet a further object of this invention to provide a process for removing trace organic contaminants which can be used simply and with existing technology and is inexpensive to implement.

It is yet an additional object of this invention to provide a sorbent material which can easily, and safely, be disposed of after it has been used to remove trace organic pollutants.

SUMMARY OF THE INVENTION

The foregoing and other objects are achieved by this invention which provides an organic carbon-containing clay sorbent which is hydrophilic and is useful for waste water treatment to remove traces of organic pollutants such as dioxins, biphenyls, polyaromatics such as benzo(a)pyrene and pentachlorophenol.

In accordance with a first aspect of the invention, a clay-based sorbent is produced having a clay with a surface and lamellar layers. Organic surfactant cations are irreversibly bound to the surface to form a novel composite structure.

In a one embodiment of the invention, the clay is an expandable clay of the type which has lamellar layers are separated by cations in exchange sites, adjacent ones of the lamellar layers forming an interlayer space. Inorganic cations occupy the exchange sites in the interlayer space. Cationic surfactant ions are irreversibly bound to the external surface of the expandable clay to form a novel structure herein defined as an inorgano-organoclay.

In one embodiment of this aspect of the invention, the expandable clay is a smectite. The smectite may be montmorillonite.

In a further embodiment, the inorganic cations are selected from the group consisting of polyvalent or multivalent cations. The multivalent cation may be a metal ion such as lanthanum and the polyvalent cation may be a hydroxy metal, such as hydroxy aluminum.

In addition to the foregoing, the cationic surfactant must bind irreversibly to the clay surface and must not displace the inorganic cations in the interlayer spacing. In certain embodiments, the monovalent cetylpyridinium chloride ion may be the surfactant. The surfactant cations may form hemimicelles on the surface of the clay.

In accordance with a further aspect of the invention, the clay-based sorbent comprises a non-expanding clay such as kaolinite. Cationic surfactant ions are irreversibly bound to the external surface of the non-expanding clay to form a novel structure herein defined as an external surface organoclay.

In accordance with a product by process aspect of the invention, one embodiment of a clay-based sorbent is prepared by the steps of:

(a) swelling an expandable clay with water, said expandable clay having a surface and interlamellar layers separated by hydrated cations, said interlamellar layers defining an interlayer spacing;

(b) reacting the swollen expandable clay with a highly charged inorganic cations which will exchange with the hydrated cations of the expandable clay; and (c) contacting the clay product of step (b) with a cationic surfactant which will not displace the inorganic cations and which will irreversibly bind to the surface of the expandable clay.

In accordance with a method aspect of the invention, this embodiment of the clay-based sorbent is made in accordance with the process steps set forth hereinabove with respect to the product by process aspect of the invention.

In accordance with a use aspect of the invention, the clay-based sorbent which is formed in accordance with the foregoing method is applied to remove organic trace components from industrial waste effluent. Removal of trace organic pollutants in the industrial waste effluent is effected by microseparation of the trace pollutants from the water by the clay-based adsorbent.

In a practical embodiment of the invention, an effective amount of the modified clay sorbent can be stirred into a settling tank into which industrial effluent water is pumped. Following adsorption of pollutants, the supernatant liquid, largely devoid of contaminants, can be separated from the sorbent by flocculation, filtration, centrifugation, settling or the like. In an alternative embodiment, the effluent water can be continuously pumped through one or a series of stirred reactors, fluidized beds, or packed columns containing the modified clay sorbent such that the outlet water will be stripped of pollutants. The used sorbent can be disposed of as a solid environmental waste, or it may be regenerated.

BRIEF DESCRIPTION OF THE DRAWING

Comprehension of the invention is facilitated by reading the following detailed description, in conjunction with the annexed drawing, in which.

DETAILED DESCRIPTION

Reference to FIG. 1 shows a schematic representation of the novel inorgano-organoclay of the instant invention. The novel modified clay sorbent of the instant invention is a composite sorbent in which the interlayer space of a clay is mostly occupied by metal or metal hydroxy cations and the organic carbon of a surfactant is, therefore, located on the external surface. The hydrocarbon part of the surfactant ion is specifically bound to the surface through a combination of Van der Waals and micellar attractive forces. The hydrocarbon tail portion points toward the surface of the clay while the cationic part is in contact with the aqueous medium. Thus, an organic carbon-containing clay which is hydrophilic is formed. The inorgano-organoclay has an oily layer sandwiched between the inorganoclay core and the cationic head group.

The clays of the instant invention have the surface organic carbon irreversibly adsorbed on the external surface of the clay layers to form what can be termed "external surface organoclays."

In a method aspect of the invention, expandable clays are treated with multivalent or polymeric and polyvalent inorganic cations which bind strongly to exchange sites on the clay and also advantageously reduce the tendency of the layers to expand in a dilute solution. Subsequent treatment with weaker cations, such as monovalent cationic surfactants, results in the formation of an external surface organoclay. This arises from the inability of the monovalent surfactant cation to displace the inorganic cations of higher valency from the interlayer space.

The expandable clay used in the practice of this embodiment of the invention is advantageously selected to be a smectite. Smectite clays are swelling phyllosilicate minerals in which two-dimensional oxyanions are separated by layers of hydrated cations. Oxygen atoms define upper and lower sheets of tetrahedral sites and a central sheet of octahedral sites. There is a 2:1 ratio of tetrahedral to octahedral sites within a layer. Smectites possess a unique capacity for cation exchange (CEC of at least 75 meq/100 g clay), intercalation, and swelling. The hydrated cation on the interlamellar surface can be replaced with almost any desired cation by simple ion exchange techniques.

In a specific illustrative embodiment, $Na^+$-montmorillonite (Wyoming SWY-1) obtained from Source Clay Minerals Repository, University of Missouri, Columbia, MO which possesses a charge density in the range of 0.8 to 1.1. meq/g smectite yields an effective modified clay sorbent. However, any other swelling, cation exchange form of montmorillonite, such as lithium or potassium montmorillonite, can be used. Other smectite clays, such as hectorites, beidellites, nontronites, saponites, etc. can be utilized in the production of the modified clay sorbent in accordance with the principles of the invention hereof. Of course, other clay-like minerals, such as mica or pyrophyllite, could also be utilized. The two aforementioned minerals, in particular, have a 2:1 framework similar to smectites.

In an alternative embodiment of the invention, an external surface organoclay composition can be prepared from a non-expandable clay, such as kaolinite. Kaolinite is a clay mineral which has a 1:1 ratio in which layers are formed by coupling only one tetrahedral site to an octahedral site. Inasmuch as there are no interlayer spacings to be occupied with cations, the surfactant cations will locate on the external surface of the non-expandable clay in the orientation illustrated in FIG. 1 for inorgano-organoclay. Suitable surfactants for this purpose must irreversibly bind to the surface of the non-expandable clay. In contrast, prior art organoclays have the surface organic carbon irreversibly localized between clay layers and can be designated interlayer organoclays.

Returning to the inorgano-organoclay embodiment, the inorganic cations used to occupy the interlayer spacing of the expandable clay are either highly charged multivalent metal ions or polyvalent metal hydroxide ions which readily exchange with cations on the clay surface and bind strongly to the negatively charged clay surface. Specific examples of metal ions include, lanthanum ($La^{+3}$) and zinc.

In a specific advantageous embodiment, the inorganic cation comprises hydroxy aluminum. The metal component, however, could be chromium or iron, for example. Hydroxy aluminum is a polynuclear cation formed according to the following reaction:

Hydroxy aluminum has a positive charge of +7 per polymeric unit and readily exchanges on the negatively charged clay surface. Moreover, due to its polymeric size, the hydroxy aluminum cation is virtually non-exchangeable from its binding site in the modified clay under conditions of low ionic strength and pHs between 2 and 11.

The cationic surfactant should be unable to displace the strongly bound inorganic ions in the inorgano-organoclay embodiment. In both inorgano-organoclay embodiments and external surface organoclay embodiments, the cationic surfactant must irreversibly bind to the surface. In specific illustrative embodiments, monovalent surfactants cetylpyridinium chloride and cetylalkonium chloride irreversibly bind to the clay surface and, in the case of inorgano-clay, do not displace the interlayer inorganic cation. A fairly lengthy hydrocarbon tail portion, e.g., twelve to eighteen carbons, produce advantageous results. Moreover, the surfactant must be water soluble.

Figure 2:
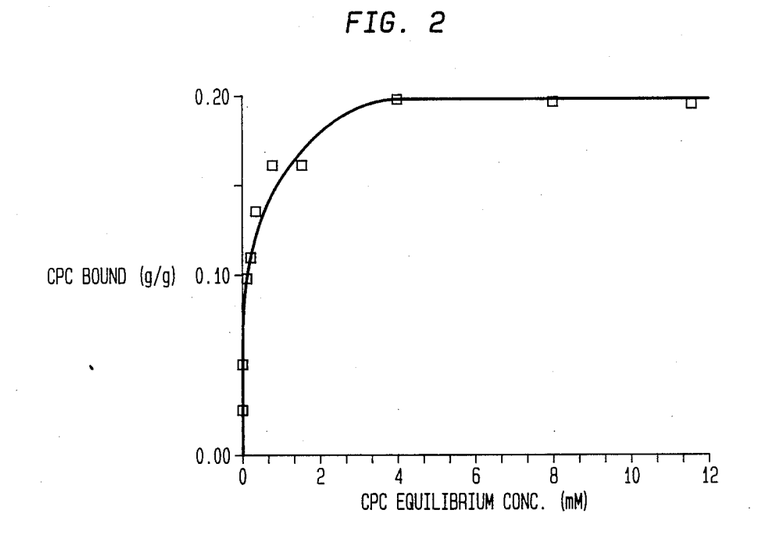
FIG. 2 is a graphical representation of a typical adsorption isotherm for binding of the surfactant ion cetylpyridinium on hydroxy aluminum clay.

In a specific illustrative embodiment, binding of the surfactant, cetylpyridinium chloride (CPC), to hydroxy aluminum montmorillonite was studied by equilibrating increasing concentrations of the surfactant with a fixed amount of hydroxy aluminum montmorillonite. Equilibrium was attained in a 24 hour period. CPC ion in the supernatant was analyzed by a liquid-phase organic carbon method. Alternatively, spectrophotometric absorbance at 259 nm can be used to assay CPC in solution. The bound CPC ion concentration was taken as the difference between the initial and the equilibrium solution concentrations of CPC ion. Initial concentrations of CPC were varied from 0.35 mM to 14.0 mM. Under the experimental conditions, the critical micelle concentration of the surfactant ion is around 0.7 mM. The binding isotherm is shown in FIG. 2.

Generation of a binding isotherm indicates the type of binding. In this case, binding of CPC ion to hydroxy aluminum montmorillonite is of the high affinity, Langmuir type as demonstrated by the large initial slope. An adsorption plateau is reached at around 4 mM equilibrium concentration corresponding to an initial CPC concentration of 7.0 mM which is approximately ten times the critical micelle concentration of the surfactant ion. The organic carbon content was assayed and found to be 12%. This corresponds to a surface CPC concentration of 0.17 g/g. This surface concentration is obtained at a bulk CPC concentration of about 2.8 mM.

Figure 3:
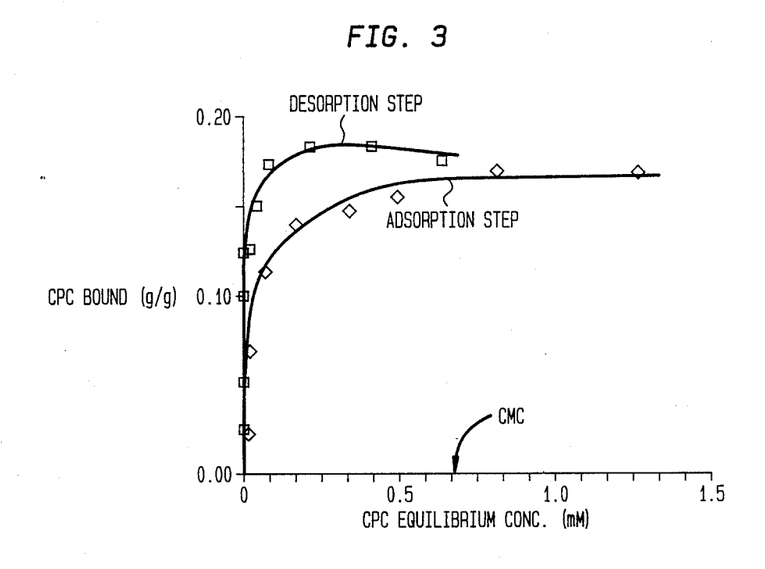
FIG. 3 is a graphical representation of an adsorption isotherm and a desorption isotherm for the binding and desorption of the surfactant ion cetylpyridinium on hydroxy aluminum clay.

FIG. 3 is a graphical representation of adsorption and desorption isotherms for CPC in combination with hydroxy aluminum montmorillonite. The hysteresis and positive y-intercept demonstrate that CPC binds irreversibly to hydroxy aluminum montmorillonite. Thus, continued exposure of the modified inorgano-organoclay sorbent of this invention to CPC-free solutions, such as industrial waste water, will not result in loss of adsorbed CPC from the sorbent. Therefore, the efficacy of the sorbent will not decrease with time.

The adsorption plateau occurs at about the critical micelle concentration of the surfactant ion (0.7 mM). It is postulated that surface coverage of surfactant ions at saturation levels of adsorption results in the formation of two-dimensional aggregates termed "hemimicelles."

The following specific examples will aid explanation of the application of the principles of the invention.

EXAMPLE 1

Preparation of hydroxy aluminum montmorillonite (herein designated as "Hydal-Clay") can be accomplished in accordance with the description of U.S. Pat. No. 4,740,488, the disclosure of which is incorporated herein by reference. Inasmuch as the preparation of Hydal-Clay is a prerequisite for the preparation of certain embodiments of the inorgano-organoclays of the present invention, an illustrative preparatory technique is described herein.

$Na^+$-montmorillonite clay is swollen with distilled water, dried, and treated with an excess of hydroxy aluminum solution. Preferably the hydroxy aluminum solution is an aged, commercially available solution (Reheis Co.; OH—/Al ratio of 2.54; pH of 4.5) in a concentration of 0.3M in water. The ratio of OH—/Al is preferably in the range of approximately between 2.0 and 3.1. The resulting mixture should contain approximately 5% by weight (50 mg/ml) expanded clay.

The clay product is filtered and the filter cake is subsequently washed and dried. The dried filter cake is then ground into a powder and resubjected to the hydroxy aluminum treatment. The resulting modified clay product is filtered, dried, and powdered again to produce a Hydal-Clay sample.

EXAMPLE 2

A specific illustrative embodiment of inorgano-organoclay, cetylpyridinium-hydroxy aluminum-montmorillonite, herein designated "CPC-Hydal-Clay" is prepared in accordance with the following technique.

Hydal-Clay (1 g) prepared in accordance with the technique of Example 1 is mixed with an aqueous solution of cetylpyridinium chloride (CPC; molecular weight=358 g/mole) having about 30% CPC by weight. This mixture is stirred for a predetermined period of time (illustratively, 2 hours). The resulting slurry is centrifuged to separate the modified clay product. The clay product is washed numerous times (e.g., 5–6 X) with deionized water to remove excess CPC ion. The clay product is dried (110° C. oven for 24 hours) and then ground to a fine powder, illustratively to an average particle size of 1.0 mm. The organic carbon content of the resulting CPC-Hydal-Clay has been assayed to be around 12% by weight.

EXAMPLE 3

In another specific illustrative embodiment of the invention, Cetylpyridinium-Lanthanum-Montmorillonite (herein designated "CPC-La-Clay") is prepared by ion exchanging $Na^+$-montmorillonite with an excess of Lanthanum ions ($La^{+3}$) so that there is complete exchange of $Na^+$ ions from the interlayer space of the expanded clay.

$Na^+$-montmorillonite is washed with 0.5M NaCl to insure that it is in the Na form. The $Na^+$-montmorillonite is then subjected twice to a 0.1M solution of $LaCl_3$ so that all of the $Na^+$ ions are replaced by $La^{+3}$ ions. The resulting modified clay product (herein designated "La-Clay") is washed extensively to remove excess $La^{+3}$ ions.

Figure 4:
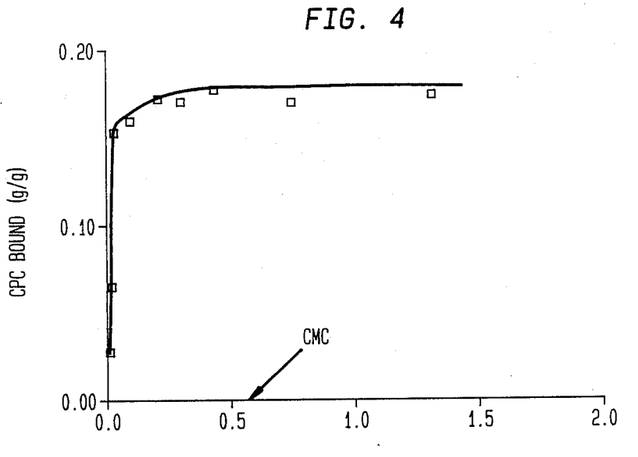
FIG. 4 is a graphical representation of a typical adsorption isotherm for binding of the surfactant ion cetylpyridinium on lanthanum clay.

1 g of La-Clay is mixed with an aqueous solution of cetylpyridinium chloride as described in Example 2. The resulting slurry is stirred for a predetermined period of time sufficient to permit the CPC to adhere to the clay surface. The slurry may be centrifuged or filtered, for example, to separate the modified clay product from the liquid and the washing/drying/grinding procedures described hereinabove are followed to yield dry, powdered CPC-La-Clay. The amount of organic carbon on CPC-La-Clay was determined to be on the order of 11% by weight. Reference to FIG. 4 shows an adsorption isotherm for CPC to La-Clay which is indicative of strong, irreversible binding of the CPC cations to La-Clay.

In an alternative embodiment of the invention, the separation/washing/drying/grinding procedures are not necessary. In a use embodiment wherein the modified clay sorbent is to be employed in an aqueous environment for the removal of trace pollutants, the slurry may be added directly to the aquatic environment from which contaminants are to be removed.

EXAMPLE 4

An external surface organoclay product is synthesized using a non-expanding clay as the starting material so that all of the organic carbon necessarily locates on the external surface of the clay.

1 g of kaolinite is washed with 0.5M NaCl. The solution of the kaolinite and CPC (10% by weight) is stirred for two hours. The resulting product is designated herein as "CPC-Kaolinite." The surface organic carbon content of CPC-Kaolinite was determined to be only 2-3% by weight.

EXPERIMENTAL RESULTS

Representative specimens of various types of organic contaminants were used to demonstrate the effectiveness of the novel clay compositions of the present invention. In particular, three of these sorbates are representative of the entire spectrum of properties of typical pollutants found in coal conversion waste water, for example. Table 1 lists some of the relevant properties of these test sorbates.

TABLE 1
PROPERTIES OF SELECTED ADSORBATES

| PROPERTY | Benzo(a)Pyrene | Fluorene | Pentachlorophenol |
|---|---|---|---|
| Solubility in Water (25 C.) | 3 ppb | 1.9 ppm | 14.0 ppm |
| # of aromatic rings | 5 | 2 | 1 |
| Toxicity | Carcinogenic | Nontoxic | Source of dioxins |

Single solute adsorption studies were performed using $^{14}C$-labelled sorbates obtained from Sigma Chemicals Company. Batch-type equilibration experiments were carried out in a constant temperature shaker bath for 24-36 hours. The medium consisted of deionized water at a pH of 5.5 maintained at a temperature of $25°+2°$ C. Initial sorbate concentrations were less than 50% of their respective aqueous solubilities at $25°$ C. as reported in Table 2. Sorbent concentration was 0.25 g/dm$^3$.

After the equilibration time, the sorbent phase was separated from the solution phase by centrifugation and samples from each phase were assayed separately using a liquid scintillation spectrometer.

One indication of the efficiency of a sorbent is the binding affinity or the linear partition coefficient (PC) of the sorbent for a given organic compound (sorbate) in solution. The PC is defined as the ratio between the surface concentration of the compound and its solution concentration. The higher the value of PC, the smaller the amount of sorbent required to attain a predetermined level of pollutant removal and the cheaper the overall process is.

The relative sorption efficiency of each sorbent was quantified in terms of Henry's Law and the associated PC defined as follows:

$$PC = \frac{ng \text{ bound sorbate/kg sorbent}}{ng \text{ sorbate in solution/dm}^3 \text{ solution}}$$

The units of PC are (dm$^3$/kg) or equivalently (ml/g).

Table 2 summarizes the results for exemplary sorbents of the following types: inorganoclay (Hydal-Clay), organoclay (CPC-Clay), inorgano-organoclay (CPC-Hydal-Clay) and activated carbon. CPC-Clay is an organoclay of the known type synthesized by cation exchange between cetylpyridinium ions with Na$^+$ on montmorillonite.

TABLE 2
PC VALUES OF CPC-CLAY and CPC-HYDAL-CLAY
Sorbent concentration = 0.25 g/dm$^3$
Overall mass balance = 94–14 98%
PC × 10$^{-3}$ (dm$^3$/kg)

| Organic Compound | Aqueous Solubility | HYDAL-CLAY | CPC-CLAY | CPC-HYDAL-CLAY | GAC* |
|---|---|---|---|---|---|
| Octachlorodioxin | 0.2 pptr | — | 105.0 | 100.0 | 95.0 |
| 2,2'4,4',5,5'-Hexachlorobiphenyl | 8.8 ppb | — | 117.5 | 88.0 | 42.0 |
| 2,4,2',4'-Tetrachlorodiphenyl | 68.0 ppb | — | 88.3 | 102.3 | 168.0 |
| 3,4,3',4'-Tetrachlorobiphenyl | 175.0 ppb | — | 134.0 | 124.9 | 192.0 |
| Fluorene | 1.9 ppm | 1.0 | 1.0 | 13.6 | 22.5 |
| Benzo(a)pyrene | 3.3 ppb | 20.5 | — | 67.3 | 38.6 |
| Pentachlorophenol | 14.0 | 0.1 | 16.0 | 155.0 | 210.0 |

*Granulated Activated Carbon; Filtrasorb 400, Calgon Corporation

The inorgano-organoclay composition of the instant invention is comparable to, and in some cases, better than activated carbon in its binding efficiency for all of the sorbates tested.

Figure 5:
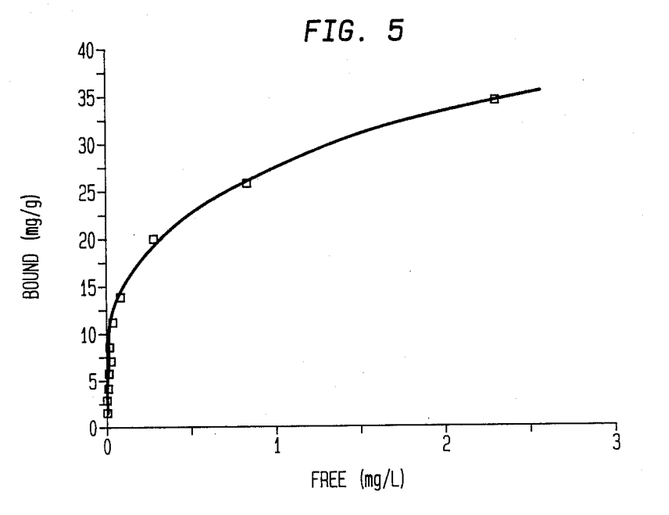
FIG. 5 is a graphical representation of a typical adsorption isotherm for binding of the sorbate pentachlorophenol (PCP) to cetylpyridinium-hydroxy aluminum-montmorillonite, an inorgano-organoclay of the present invention.

In another specific example, the binding of the sorbate pentachlorophenol (PCP) to CPC-Hydal-Clay has been investigated. FIG. 5 shows a typical adsorption isotherm which depicts a strong affinity of PCP for the inorgano-organoclay sorbent.

Figure 6:
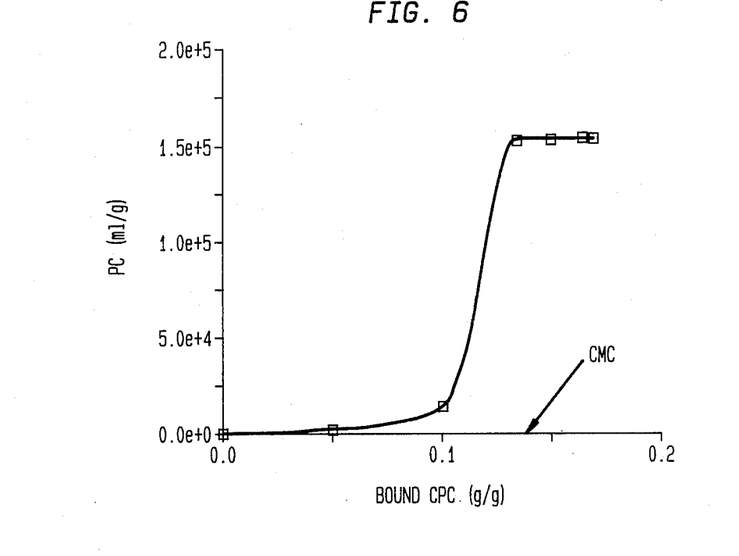
FIG. 6 is a graphical representation of the binding of the sorbate PCP to cetylpyridinium-hydroxy aluminum-montmorillonite expressed in terms of partition coefficient versus bound cetylpyridinium ion concentration.

FIG. 6 is a graphical representation of the binding of PCP to CPC-Hydal-Clay expressed in terms of partition coefficient versus bound cetylpyridinium ion concentration. FIG. 6 demonstrates that the formation of a high density, closely packed layer of cetylpyridinium ions on the surface of CPC-Hydal-Clay triggers the remarkable sorption properties of CPC-Hydal-Clay. As discussed hereinabove, the active surface species is known as "hemimicelle" or a two-dimensional counterpart of a surfactant micelle formed in solution at a bulk concentration of surfactant equal to the so-called critical micelle concentration (CMC). The CMC is indicated on FIG. 6 with an arrow. PC values, which rise sharply below the CMC of the surfactant, plateau at the CMC. The isotherm of FIG. 3 demonstrates that CPC is irreversibly bound to CPC-Hydal-Clay and FIG. 6 demonstrates that the endpoint in the formation of CPC-Hydal Clay is the appearance of a CPC hemimicelle on the Hydal-Clay surface. The hemimicelle enables CPC-Hydal-Clay to adsorb toxic organics strongly.

Data concerning the CMC of a given surfactant is available in the literature. As a specific example, reference is drawn to Mukerjee, et al., "Critical Micelle Concentration of Aqueous Surfactant Systems," NSRDS-NBS 36, 1971.

Figure 7:
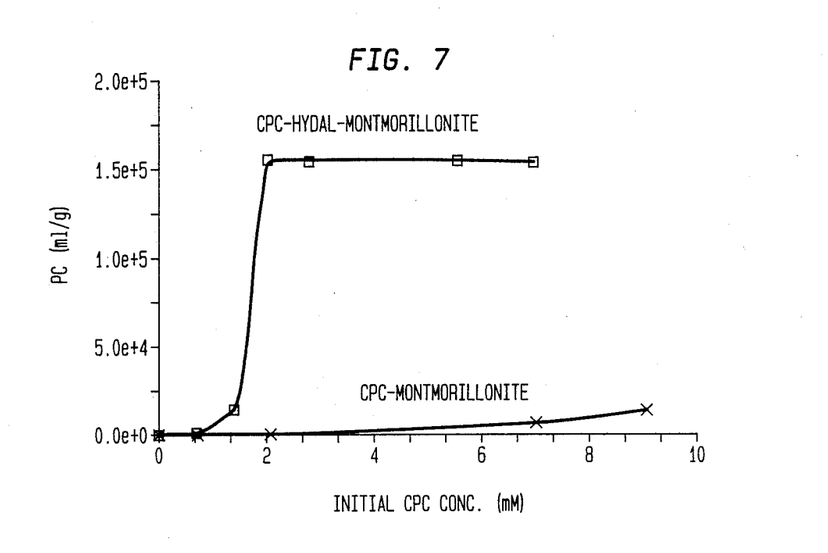
FIG. 7 is a graphical representation of the binding of the sorbate PCP to cetylpyridinium-hydroxy aluminum-montmorillonite as compared to cetylpyridinium-montmorillonite (prior art organoclay) expressed in terms of partition coefficient versus bound cetylpyridinium ion concentration.

FIG. 7 is a plot of the sorptive behavior of CPC-Hydal-Clay and CPC-Clay for the sorbate PCP which graphically depicts the effectiveness of inorgano-organoclay vis-a-vis a prior art organoclay. Increasing concentrations of CPC ions were reacted with Hydal-Clay and $Na^+$-montmorillonite, respectively, to form the respective modified sorbent compositions. For each bulk concentration of CPC ion, partitioning of PCP between the surface of the clay and the bulk phase was monitored using $^{14}C$-labelled PCP. The binding efficiency expressed as PC is plotted against the CPC concentration in FIG. 7. CPC-Hydal-Clay is clearly superior to CPC-Clay for the adsorption of PCP.

Another advantageous feature of the novel clay compositions of the present invention is illustrated by the organic clay content of the respective sorbents. Organic carbon attains a plateau value of 12% by weight in CPC-Hydal-Clay whereas the plateau value for CPC-Clay is 19.2%. Thus, less surfactant is necessary for the production of the inorgano-organoclay composition than for prior art organoclays. Therefore, the cost of the sorbent is decreased. Of special note is the fact that the external surface organoclays have even less organic surface carbon content (2-3%) and are still effective (see Table 3 hereinbelow). The efficacy of the novel modified clay sorbents in view of the fact that they contain less organic surface carbon than known organoclays is surprising inasmuch as there is a widely held belief in the art that more organic surface carbon makes a better sorbent.

In yet another illustrative example of the efficacy of the modified clay sorbents of the present invention, comparative partition coefficient data for various modified clay sorbents and activated carbon for the sorbate benzo(a)pyrene are shown in Table 3. Benzo(a)pyrene is herein designated as B(a)P.

TABLE 3

BINDING OF B(a)P TO INORGANO-ORGANCLAYS and INORGANOCLAYS
Initial B(a)P Concentration = 0.2 ppb
Sorbent Amount = 250 ppm

| SORBENT | PARTITION COEFFICIENT $PC \times 10^{-3}$ ($dm^3/kg$) |
|---|---|
| Lanthanum-Clay (Inorgano-clay) | 15.5 |
| HYDAL-CLAY (Inorgano-clay) | 20.5 |
| La-CPC-CLAY (Inorgano-organo-clay) | 84.1 |
| CPC-HYDAL-CLAY (Inorgano-organo-clay) | 95.8 |
| CPC-Kaolinite (external surface organoclay) | 45.0 |
| Granulated Activated Carbon | 38.6 |

Figure 8:
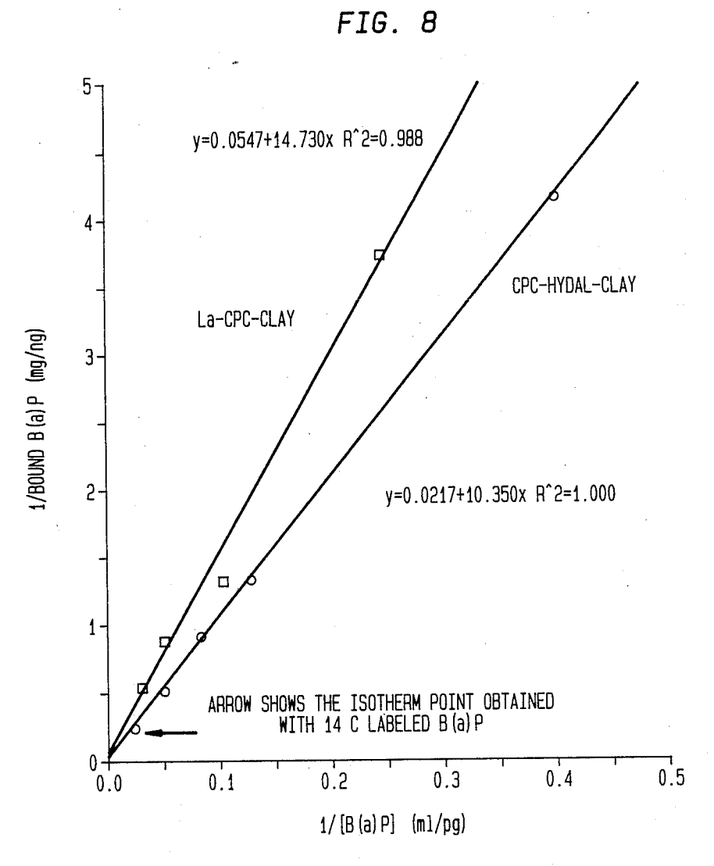
FIG. 8 is a graphical representation of the adsorption isotherms, displayed in a double reciprocal plot, for the binding of the sorbate benzo(a)pyrene to two inorgano-organoclays of the present invention.

The full adsorption isotherm for B(a)P binding to CPC-La-Clay and CPC-Hydal-Clay is shown in FIG. 8. The data is displayed in a double reciprocal plot. Initial concentrations of B(a)P range from 0.07 ppb to 0.50 ppb. The respective monolayer capacities and binding constants, derived from the double reciprocal form of the Langmuir Equation, are given below in Table 4.

TABLE 4

BINDING PARAMETERS FROM FIG. 8

| PARAMETERS | SORBENT | |
|---|---|---|
| | CPC-HYDAL-CLAY | La-CPC-CLAY |
| Monolayer Capacity | 46.1 mg/g | 18.3 mg/g |
| Binding Constant | $2.1 \times 10^9$ ml/g | $3.7 \times 10^9$ ml/g |

The aqueous capacity of B(a)P is only 3.3 ng/ml. This is less than one thousandth of the monolayer capacity of the above-referenced sorbents. Thus, the efficacy of the novel inorgano-organoclays of the invention for adsorption of B(a)P and related compounds is clearly demonstrated.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A clay-based sorbent comprising:
   (a) a clay having an external surface and lamellar layers; and
   (b) cationic surfactant ions having a hydrocarbon portion and a cationic head portion, the cationic surfactant ions being irreversibly bound to the external surface by the hydrocarbon portion.

2. The clay-based sorbent of claim 1 wherein the clay is an expandable clay wherein the lamellar layers are separated by cations in exchange sites, said clay-based sorbent further comprising:
   highly charged inorganic cations located in the exchange sites so that the cationic surfactant ions bind to the external surface.

3. A clay-based sorbent comprising:
   (a) expandable clay of the type having an external surface and interlamellar layers, adjacent ones of the interlamellar layers defining an interlayer spacing;
   (b) inorganic cations separating the interlamellar layers and being located in the interlayer spacing; and
   (c) cationic surfactant ions having a hydrocarbon portion and a cationic head portion, the cationic surfactant ions being irreversibly bound to the external surface of the expandable clay by the hydrocarbon portion.

4. The clay-based sorbent of claim 3 wherein the expandable clay is a smectite.

5. The clay-based sorbent of claim 4 wherein the smectite is montmorillonite.

6. The clay-based sorbent of claim 3 wherein the inorganic cations are selected from the group consisting of polyvalent metal hydroxides and multivalent metal cations.

7. The clay-based sorbent of claim 6 wherein the multivalent metal cations are selected from the group consisting of Lanthanum ions and Zinc ions.

8. The clay-based sorbent of claim 6 wherein the polyvalent metal hydroxy cations are selected from the group consisting of hydroxy aluminum, hydroxy chromium, and hydroxy iron polymers.

9. The clay-based sorbent of claim 3 wherein the cationic surfactant ions are monovalent cations selected from the group consisting of ionized cetylpyridinium chloride and cetylalkonium chloride.

10. The clay-based sorbent of claim 3 wherein said cationic surfactant ions form hemimicelles on the external surface of the expandable clay.

11. A clay-based sorbent prepared by the method comprising the steps of:
 (a) swelling an expandable clay with water, the expandable clay having an external surface and interlamellar layers separated by hydrated cations, the interlamellar layers defining an interlayer spacing;
 (b) reacting the swollen expandable clay with highly charged inorganic cations which will exchange with the hydrated cations of the expandable clay and occupy the exchange sites in the interlayer spacing; and
 (c) contacting the clay product of step (b) with cationic surfactant ions which will not displace the highly charged inorganic cations and which will irreversibly bind to the external surface of the expandable clay.

12. A method of making a clay-based sorbent, the method comprising the steps of:
 (a) swelling an expandable clay with water, the expandable clay having an external surface and interlamellar layers separated by hydrated cations, the interlamellar layers defining an interlayer spacing;
 (b) reacting the swollen expandable clay with highly charged inorganic cations which will exchange with the hydrated cations of the expandable clay and occupy the exchange sites in the interlayer spacing; and
 (c) contacting the clay product of step (b) with cationic surfactant ions which will not displace the highly charged inorganic cations and which will irreversibly bind to the external surface of the expandable clay.

13. Cetylpyridinium-aluminum hydroxy-montmorillonite.

14. Cetylpyridinium-Lanthanum-montmorillonite.

15. Cetylpyridinium-Kaolinite.

16. The clay-based sorbent of claim 1 wherein the clay is a non-expandable clay.

17. The clay-based sorbent of claim 16 wherein the non-expandable clay is kaolinite.

18. The clay-based sorbent of claim 16 wherein the cationic surfactant ions are selected from the group consisting of ionized cetylpyridinium chloride and cetylalkonium chloride.

19. A clay-based sorbent prepared by the method comprising the step of:
 contacting a clay having an external surface and non-expanding interlamellar layers with cationic surfactant ions, the cationic surfactant ions having a hydrocarbon portion and a cationic head portion, such that the cationic surfactant ions are irreversibly bound to the external surface of the clay by the hydrocarbon portion.

* * * * *